July 15, 1958  W. E. BAKER  2,842,969
MOTION TRANSMITTING MEANS
Filed March 1, 1952
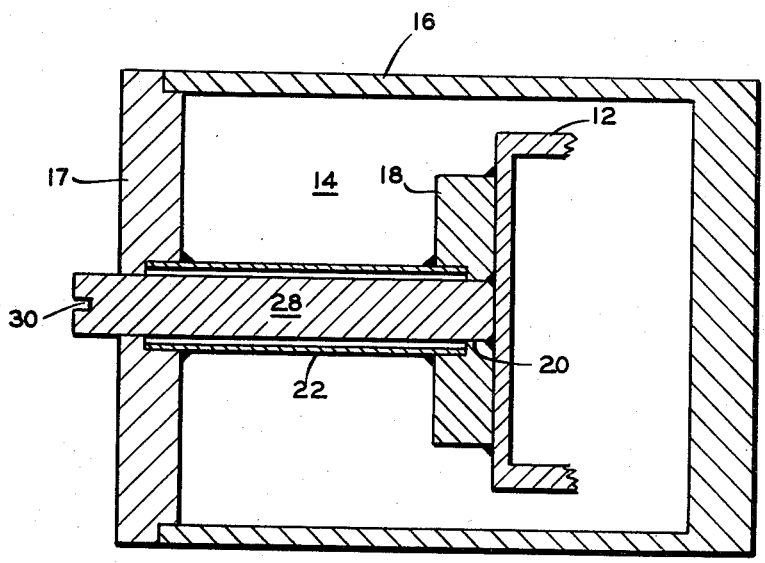
INVENTOR.
WILLIAM E. BAKER
BY
C. R. Miranda
ATTORNEY

United States Patent Office 2,842,969
Patented July 15, 1958

2,842,969

MOTION TRANSMITTING MEANS

William E. Baker, Waldwick, N. J., assignor to Bendix Aviation Corporation, Teterboro, N. J., a corporation of Delaware Application March 1, 1952, Serial No. 274,468

2 Claims. (Cl. 74—18)

This invention in general relates to means for transmitting motion and more particularly, to means for providing the transmission of a limited amount of motion from one side of a wall to another, the transmission of motion being from the exterior of a hermetically sealed housing to the interior thereof.

When a steel tube is clamped at one end and twisted at its other end, a torque is exerted which increases with the twist. If the tube is released, it will untwist itself and substantially recover its original angular position because of the elastic properties thereof. This is true, however, only for deformations which do not exceed some definite limit. This limit varies with different materials, and if it is exceeded, the deformation proceeds at an increasing rate as the action increases, and there is no complete recovery thereafter. The limit is known as the elastic limit of the material.

According to fundamental principles of physics, if a force acts upon a body, causing deformation, the internal reaction which tends to restore the original form is known as stress. Associated with stress is strain which is the deformation of the body. Strain is measured in terms of the change in some measure of the body, such as its volume or length, divided by the total measure. It is thus a ratio of two like quantities and is a pure number without dimension. The ratio of stress to strain is known as the modulus, or coefficient of elasticity, where the elastic modulus is used as a general term applying to any kind of elasticity.

If a body, such as a rod, is twisted, the relation between the stress of torque and strain (angular twist) is linear, as long as the rod retains the properties of a perfectly elastic material because their ratio is constant. But at some point, the elastic limit is reached; the strain begins to increase more rapidly than before, and the recovery from beyond this point is no longer complete. Finally at a point, known as the yield point, the stress which the body is able to support reaches a maximum and thereafter it resists less and less, though with rapidly increasing strain, until it yields completely through fracture.

The present invention contemplates novel means for transmitting motion through a pressure tight wall wherein a tube is annealed to substantially decrease its elastic limit, the material forming the tube having a slow rate of work hardening. The tube is mounted within a hermetically sealed housing and connected at one end to an object to be rotated and at the other end to a wall of the housing. A motion transmitting rod fixed to the object and extending outside of the housing is provided to angularly displace the object. Since the tube has a very low elastic limit, substantially zero restoring torque is exerted by the tube when the rod is turned to displace the object.

An object of the present invention, therefore, is to provide novel means for transmitting motion through a pressure tight wall.

Another object is to provide a novel motion transmitting means which employs a tube having a low elastic limit whereby it undergoes substantially non-elastic deformation.

A further object is to provide novel motion transmitting means wherein a tube having a low elastic limit is employed to maintain angular displacement of an object, which has been rotated by a turning member, without the tube applying an appreciable restoring torque to the member.

The above and other objects and advantages of the present invention will appear more fully hereinafter from a consideration of the detailed description which follows taken together with the accompanying drawing wherein the single figure of the drawing illustrates one embodiment of the invention.

Referring now to the drawing for a more detailed description of the present invention and wherein one embodiment hereof is clearly illustrated, an object 12 (only part of which is shown) is accommodated within a chamber 14 defined by the walls of a housing 16. The housing comprises a cover plate 17 which forms a wall thereof and is secured to the intermediate wall portion in any suitable manner, such as by a silver brazing process. Secured to object 12 is a plate 18 which has a circular aperture 20. Located within housing 16 is a tube 22 which has one end secured to plate 18 within a portion of aperture 20, and the other end of the tube is located within an aperture of wall 17 and secured thereto in any suitable manner. Extending through tube 22 and held at one end to plate 18, within aperture 20, is a rod 28 which extends externally of the housing. Rod 28 has means, such as a kerf 30, cut in outer end thereof whereby a suitable tool may be inserted in the kerf so as to rotate the rod and object 12. From the foregoing, it may be seen that tube 22 and wall 17 serve to seal the interior of housing 16 to the surrounding atmosphere to thereby form a hermetically sealed housing.

Heretofore, motion transmitting arrangements employed torque tubes which when twisted within their elastic limits, produced a restoring torque in opposition to the applied torque producing the motion to be transmitted to a movable object. When the applied torque was released, the tube untwisted itself to return the rotated object to its original position. The torque tubes of these prior arrangements were always deformed within their elastic limits so that the elasticity of the tubes effected the return of the displaced objects.

The present invention contemplates a tube having elastic properties unlike those of the mentioned torque tubes, and one which has been annealed to reduce its elastic limit point, whereby the tube, when twisted about its own axis, undergoes substantially non-elastic deformation. According to the present invention, tube 22 is composed of a ductile metal, such as copper, which has a slow rate of work hardening. A "hard drawn" copper tube is selected and subjected to a suitable thermal treatment to bring it to an annealed condition. This is done by heating the tube in a furnace at a temperature of approximately 1000 degrees Fahrenheit for about thirty minutes. When the tube is taken out of the furnace and permitted to return to room temperatures, it is softer in nature and its elastic limit point is reduced considerably. It has been found that when the annealed tube is twisted about its own axis, it undergoes substantially non-elastic deformation and does not offer an appreciable elastic resistance to the torque producing the twisting motion. Though the annealed tube retains a slight amount of elasticity which cannot be eliminated, the amount is negligible so that no appreciable restoring torque is exerted by the tube, when twisted.

Thus, when rod 28 is moved through small angles to angularly displace object 12, annealed tube 22 is twisted about its own axis and undergoes substantially non-elastic deformation. Actually, the elastic limit point is so low that it is passed quickly and the deformation will be substantially non-elastic. Since the object of the invention is to provide a sealing means which permits an object to be displaced and maintained at the desired angular position the slight restoring torque offered by the tube is negligible. For example, if it is desired to angularly displace object 12 seven degrees from a zero position, rod 28 is rotated seven degrees plus a small angular distance which is equal to the angular distance that tube 22 returns the object. It has been found that by selecting tubes made of metals which have a slow rate of work hardening, such as copper, the life of the tube is lengthened considerably.

It will now be readily apparent that the present invention provides a novel means for transmitting motion through a pressure tight wall. The utilization of a sealing tube which has a very low elastic limit point provides for a simple, inexpensive and efficient means for displacing an object within a hermetically sealed housing from the exterior thereof. By providing a tube which undergoes substantially non-elastic deformation, the object may be rotated to a desired position and maintained substantially at that position.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. In apparatus for transmitting motion between the exterior and interior of a hermetically sealed housing without destroying the hermetic seal, the housing having an apertured wall portion through which the motion is to be transmitted, hermetic sealing means sealed to said portion for hermetically sealing off said aperture, said sealing means including a substantially non-elastically deformable hollow metal member having a first portion embedded in said apertured wall portion so as to extend only part way therein, means to secure said first portion in said apertured wall, and said member having a second portion secured to an object to be rotated within said housing, and a motion transmitting member secured adjacent one end thereof to the object to be moved and to said sealing means adjacent the second portion of said deformable member which is spaced from said first portion of said deformable member, said motion transmitting member being rotatably supported in a bearing surface of said housing portion which defines at least part of said aperture, said motion transmitting member being accessible from the exterior of the housing and extending through the hollow portion of said deformable member into the interior of the housing, whereby upon rotary movement of the motion transmitting member there is imparted a corresponding rotary movement to the object within said housing.

2. In an apparatus of a type including means for communicating angular displacements between the exterior and interior of a hermetically sealed housing without destroying the hermetic seal, the housing having a portion including an aperture through which the angular displacements are communicated and said apparatus including a rotatable member adapted for rotation through a predetermined range of angular displacements said member passing from the exterior of the housing through said aperture into the interior of the housing, and hermetic sealing means cooperating with said member so as to seal said aperture, a metal tube having physical characteristics so as to undergo substantially non-elastic torsional deformation upon the application of torque thereto, said tube surrounding a portion of said rotatable member with one end of said tube connected with said housing portion and its other end connected with said rotatable member so as to provide the aforesaid sealing means for said aperture and permit the rotation of said member to effect the angular displacements between the exterior and interior of the hermetically sealed housing without destroying the hermetic seal.

References Cited in the file of this patent

UNITED STATES PATENTS

| 901,339 | Grant | Oct. 20, 1908 |
| 1,966,537 | Binckley | July 17, 1934 |
| 2,520,288 | Shand | Aug. 29, 1950 |

FOREIGN PATENTS

| 105,488 | Australia | Oct. 27, 1938 |
| 962,356 | France | Dec. 5, 1949 |